Jan. 25, 1966    G. R. DEMPSTER ETAL    3,231,120
CONTAINER LOADING AND UNLOADING MECHANISM
Filed Aug. 7, 1961    3 Sheets-Sheet 1
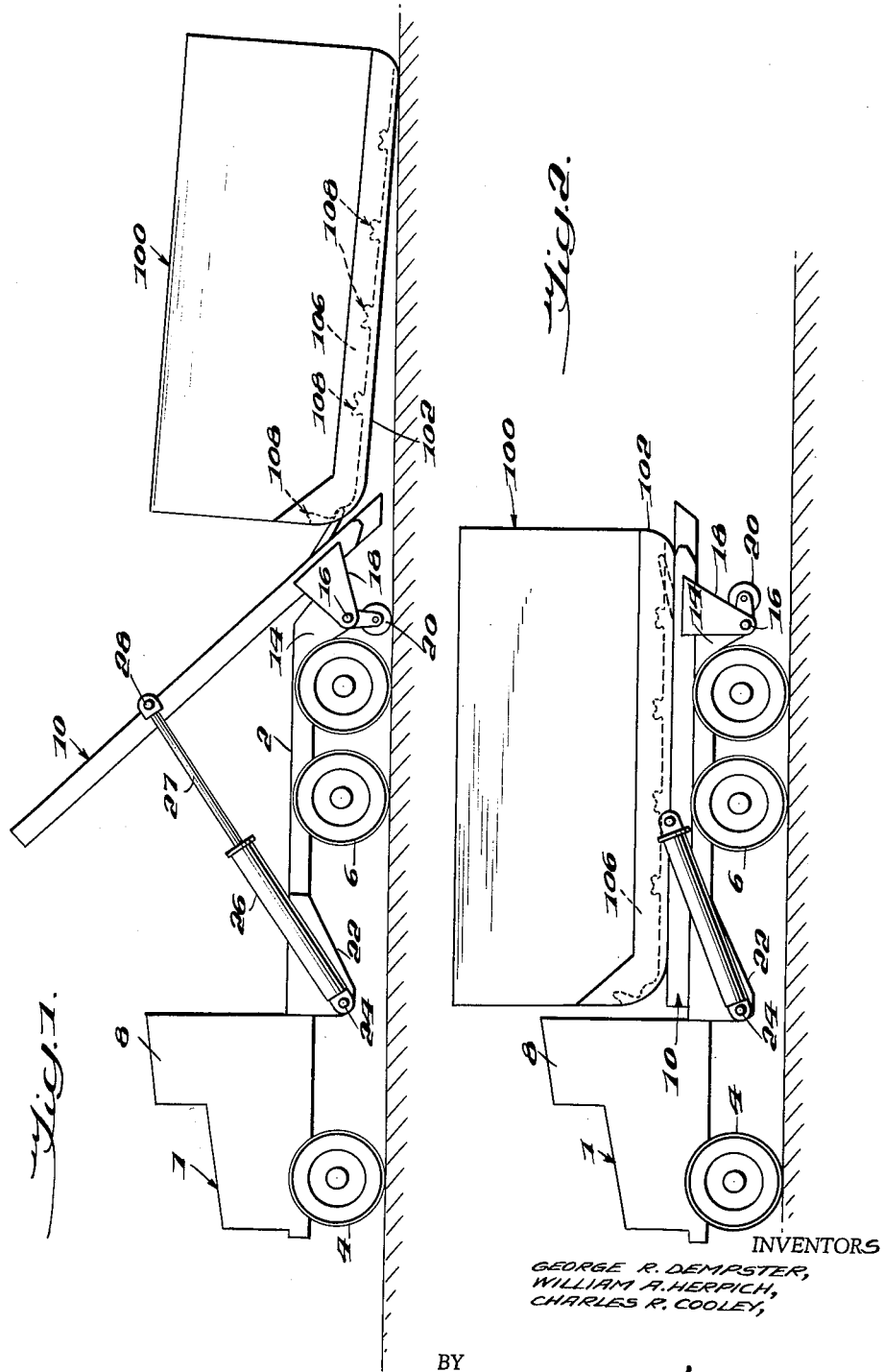
INVENTORS
GEORGE R. DEMPSTER,
WILLIAM A. HERPICH,
CHARLES R. COOLEY,
BY
ATTORNEYS

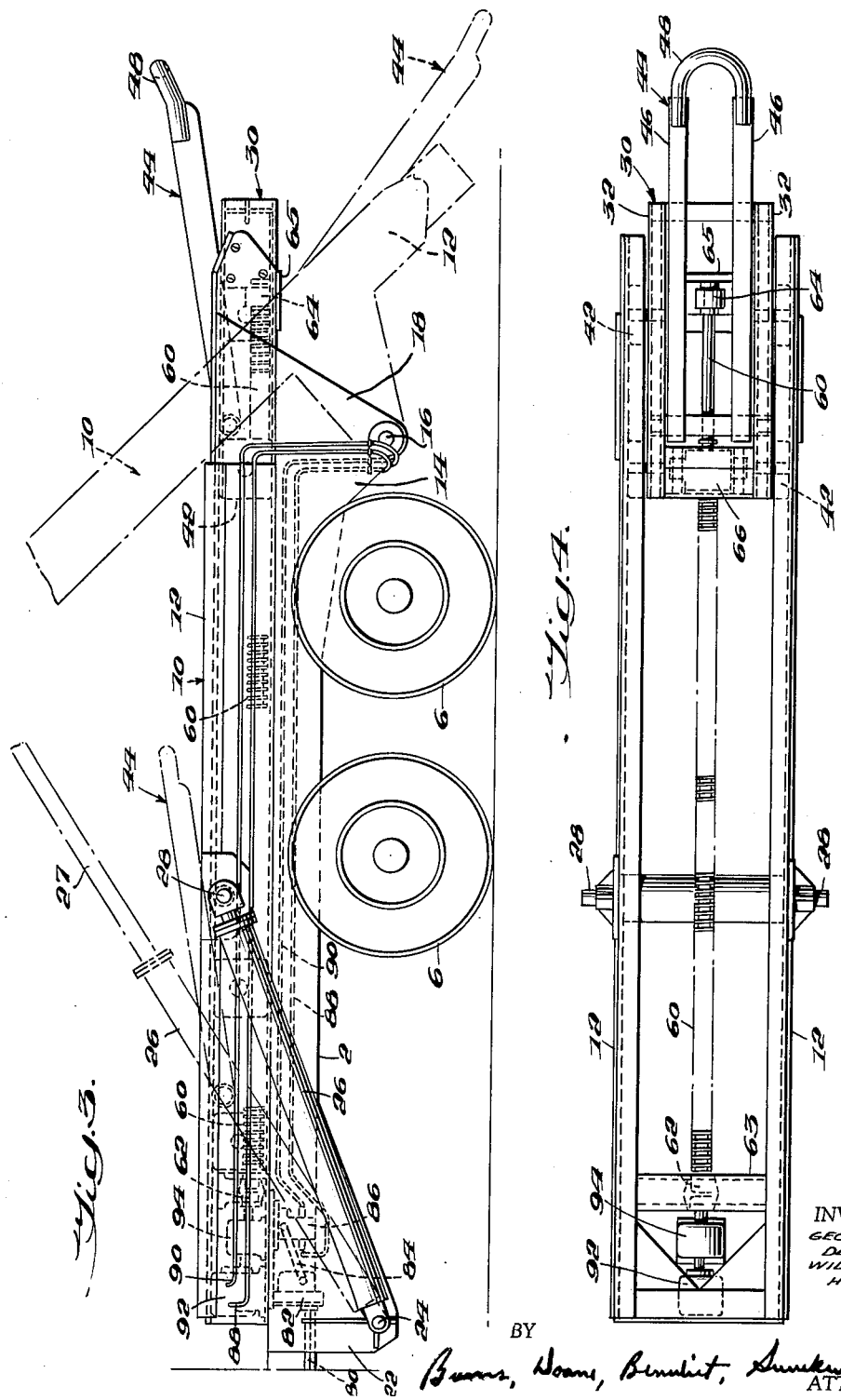

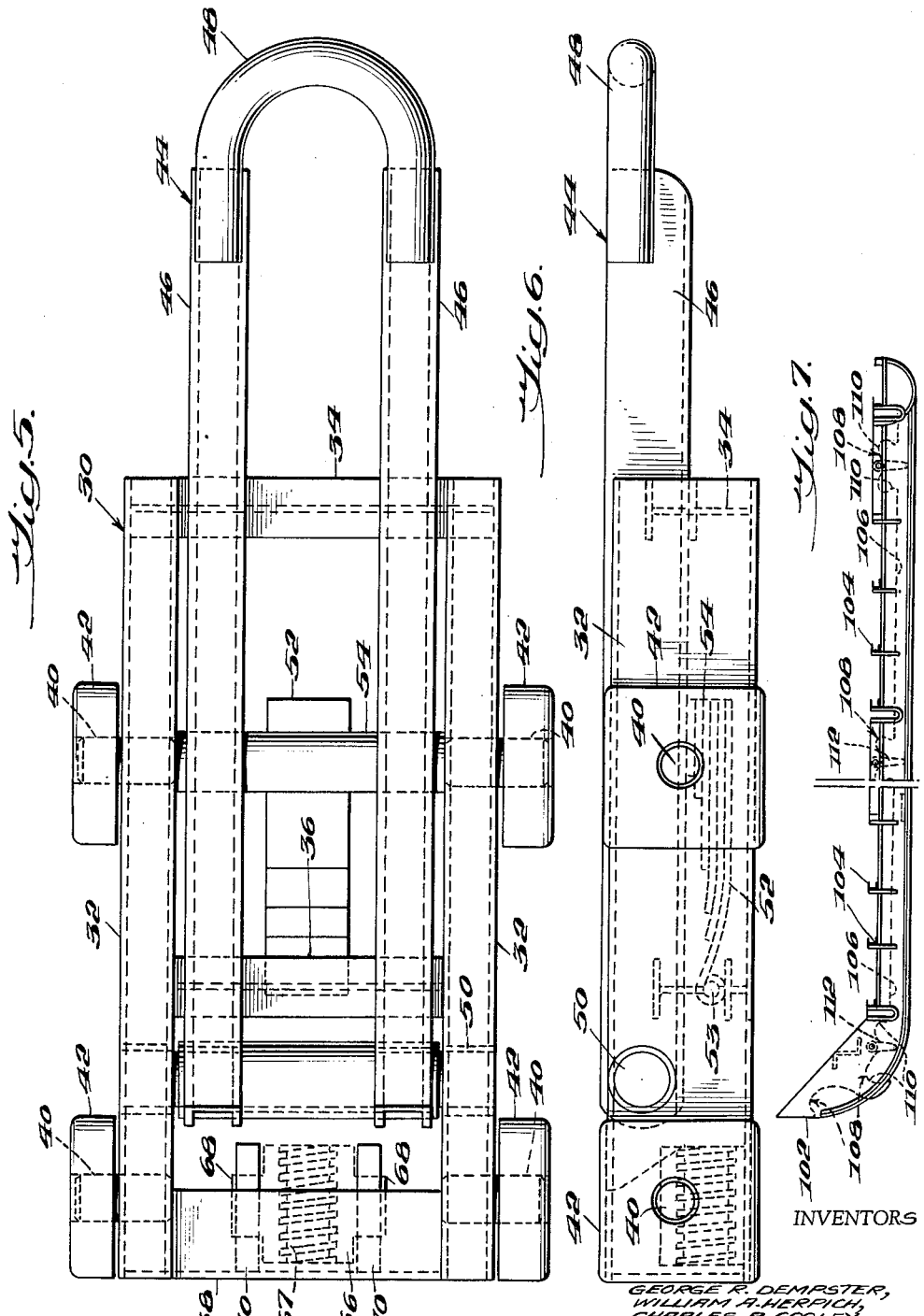

United States Patent Office 3,231,120
Patented Jan. 25, 1966

3,231,120
CONTAINER LOADING AND UNLOADING MECHANISM
George R. Dempster, Knoxville, Tenn., William A. Herpich, Galion, Ohio, and Charles R. Cooley, Knoxville, Tenn.; Trust Company of Georgia, executor of said George R. Dempster, deceased, said Herpich and said Cooley assignors to Dempster Brothers, Inc., Knoxville, Tenn., a corporation of Tennessee
Filed Aug. 7, 1961, Ser. No. 129,843
4 Claims. (Cl. 214—505)

This invention concerns improvements in container loading and unloading mechanism whereby large-size containers may be loaded and unloaded with respect to a transport vehicle. This application is a continuation-in-part of our copending application Serial No. 57,732, filed September 22, 1960.

It is often desirable to use large capacity containers for holding various types of lading and to provide for the picking up and the unloading of the containers with respect to a vehicle so that the containers may be transported. Such a container may be filled when resting on the ground or other supporting surface, after which it may be picked up by a vehicle and transported to a distant point where it can be unloaded from the vehicle or the contents discharged therefrom. If the container remains on the vehicle, it may be returned to the location of filling or to a new location and placed on the ground again for refilling.

Previous types of mechanism for picking up and for unloading large containers from vehicles have used cable-type hoisting devices, but these have not been entirely satisfactory. The undesirable features of apparatus employing cables include the fact that cables not infrequently break. Therefore, the use of such cables can be hazardous. Also, cable-type hoisting devices do not afford the desired control over the movement of the containers.

Certain other types of container loading mechanism accomplish this operation without the use of cables. Such mechanism instead uses hydraulically powered apparatus which is capable of handling containers the size of a normal truck body. These hydraulically powered devices employ a cylinder and piston device for pulling or pushing a container onto or off of a vehicle. Although this hydraulically actuated mechanism has proved to be satisfactory in the past, it has been found that an improvement in prior art devices resides in the use of apparatus whereby the container is moved onto or off the vehicle by means of a screw-operated type of mechanism rather than a cylinder and piston type of mechanism.

One object of this invention is to improve the construction of equipment for handling a detachable body or container in the loading and unloading of the container with respect to a vehicle chassis.

Another object of this invention is to provide hydraulically operated mechanism for loading a large-size container onto a chassis of a vehicle or for removing the container from the vehicle, generally, in one continuous motion.

Another object of this invention is to provide apparatus for loading or for unloading a large-size container with respect to the chassis of a vehicle wherein a safe and positive connection is established between the separable container and the apparatus, and wherein the apparatus inherently eliminates inadvertent movement of the container during a loading or unloading operation.

These objects may be accomplished according to a preferred embodiment of the invention by constructing a detachable container with supporting structure for the body thereof which may be engaged by apparatus mounted on a transport vehicle, which apparatus may be operated as needed to move the container onto or off the vehicle. The supporting structure of the container includes a series of hook stations spaced at intervals longitudinally of the container and in position for engagement by a bail pivotally mounted on a carriage. The carriage, in turn, is mounted for guided movement along a tilting frame which is pivotally connected on the rear of the vehicle chassis. The tilting frame is equipped with power devices for raising and lowering the frame with respect to the vehicle chassis. The carriage is power operated to move in a reciprocating manner lengthwise of the tilting frame. The power device which moves the carriage in this manner includes a screw member extending lengthwise of the tilting frame and mounted for rotation with respect thereto. An hydraulically actuated motor, operating through a gear reduction box, provides rotational movement for the screw member. A screw box on the carriage receives the screw member therein so that rotational movement of the screw member causes the carriage to move lengthwise of the tilting frame.

The bail on the carriage may be moved into engagement with the hook stations on the container. When the screw member is rotated to move the carriage lengthwise of the tilting frame, the bail acts on the hook stations to propel the separable contained onto or off of the tilting frame depending on the direction of rotation of the screw member.

This embodiment of the invention is illustrated in the accompanying drawings in which:

FIG. 1 is a slide elevation view showing a separable container in position to be moved onto the tilting frame of a vehicle;

FIG. 2 is a similar side elevation view showing a separable container loaded onto the vehicle;

FIG. 3 is an elarged side elevation view showing the rear portion of a vehicle and the container loading and unloading apparatus of this invention with the tilting frame illustrated by dotted lines in various positions;

FIG. 4 is a plan view of portions of the structure shown in FIG. 3;

FIG. 5 is an enlarged plan view of the carriage structure;

FIG. 6 is a side elevation view corresponding with FIG. 5; and

FIG. 7 is a side elevation view showing the subframe or supporting structure for a separable container.

The invention is illustrated as applied to a motor vehicle 1 of conventional form. The vehicle 1 has a chassis frame 2 supported by front and rear wheel and axle assemblies 4 and 6. The vehicle is power driven in the usual manner under the control of an operator located within a cab 8. The chassis frame 2 should be of sufficient length to receive thereon a relatively large container generally of the same size as a vehicle body. If desired, the chassis frame may be that of a conventional trailer which is separate from the tractor portion of the vehicle, although functioning otherwise in the same manner as described.

A tilting frame 10 is mounted on the vehicle chassis frame 2 in such a position as to be disposed directly over the longitudinal members of the chassis frame. The tilting frame 10 extends lengthwise of the chassis frame 2 and includes a pair of longitudinal channel members 12 (FIG. 3 and 4) on opposite sides of the tilting frame in vertical alignment with the sides of the chassis frame 2. The channel members 12 are spaced apart and suitably braced by intermediate connecting members which cooperate to form a unitary structure. The top surfaces of the channel members 12 are suitably strong and unobstructed so that a container may slide therealong during its movement onto or off the vehicle 1.

A pair of downwardly depending brackets 14 are fixed to the chassis frame 2 at the rear end and at opposite sides thereof. A pivot shaft 16 is supported upon and extends between the brackets 14. The shaft 16, in turn, supports a pair of brackets 18 which are rigidly connected with opposite sides of the rear end portion of the tilting frame 10. In this manner, the tilting frame 10 is pivotally mounted on the rear of the chassis frame 2 for swinging movement relative thereto about the axis of the shaft 16 in a vertical direction, as illustrated in FIGS. 1, 2 and 3.

The rear end portion of the tilting frame 10 may be provided with a stabilizing jack, if needed or desired, for accommodating abnormally heavy loads. One form of jack is shown in FIGS. 1 and 2 as including a roller 20 mounted with respect to the pivot shaft 16 for raising and lowering movements with respect thereto under control of a suitable power device. In FIG. 2 the roller is shown in a raised position, and in FIG. 1 the roller is shown in its lowered position for supporting the rear of the vehicle 1. Reference may be made to a companion application, Serial No. 811,657, filed May 7, 1959, now Patent No. 3,107,021, granted October 15, 1963, wherein such a stabilizing jack is described in detail.

The portion of the chassis frame 2 behind the cab 8 is provided with depending brackets 22 welded or otherwise secured rigidly to the members of the chassis frame. The brackets 22 support for pivotal movement a shaft 24 which extends transversely of the vehicle. Hydraulic power devices or cylinders 26 are mounted on the outer projecting ends of the shaft 24. Piston rods 27 of the power devices 26 are pivotally connected at 28 with opposite sides of the tilting frame 10. The power devices 26 are of any suitable or desired form capable of telescoping movement in raising and lowering the tilting frame 10 relative to the chassis frame 2. For example, the tilting frame can be raised by the power devices 26 to the position shown in FIG. 1 from a lowered position shown in FIG. 2.

The channel members 12 of the tilting frame 10 form opposed trackways receiving therebetween a carriage 30. The carriage 30 includes a pair of channel-shaped side members 32 (FIGS. 5 and 6) spaced apart and located in relatively close relation to the inner faces of the channel members 12 of the tilting frame 10. The side members 32 are held in spaced relation and braced by a rear cross member 34, an intermediate cross member 36 and a forward cross member 38. Additional cross members and bracing may be provided for the carriage 30 as needed.

Mounted on the respective side members 32 of the carriage 30 and extending laterally in opposite directions therefrom at longitudinally spaced points are stub axles 40. Mounting members 42 are supported on the axles 40 and may be in the form of rectangular-shaped block members, if desired, although rollers or other suitable means may be employed. These mounting members 42 form bearing supports which fit within the channel members 12 for guiding the carriage 30 lengthwise of the tilting frame 10 during reciprocating movements.

A container-connecting member or bail 44 is mounted on the carriage 30 and includes side members 46 which are connected at their rearward ends by a closed or loop section 48. The bail side members 46 extend forwardly between the carriage side members 32 and are supported at their forward ends on a pivot rod 50 which extends between the carriage side members 32. In this manner, the bail 44 may swing vertically relative to the carriage 30 about the axis of the rod 50.

A leaf-type spring 52 (FIGS. 5 and 6) is connected at 53 to the intermediate cross member 36 and extends rearwardly to the underside of a cross member 54 which extends between the side members 46 of the bail 44. For the sake of clarity the spring 52 is not shown in FIG. 4. Normally, the spring 52 forces the free or rearward end of the bail 44 upwardly above the top edge of the side members 32 of the carriage 30. The normal position of the bail 44 with respect to the carriage 30 is illustrated in FIG. 3. At times during the operation of the carriage 30, the bail 44 will be depressed against the action of the spring 52. The extreme depressed position of the bail 44 is illustrated in FIG. 6.

For a further explanation of the tilting frame, carriage and bail, reference may be made to companion applications Serial No. 744,107, filed June 24, 1958; and Serial No. 800,320, filed March 18, 1959.

The driving arrangement for propelling the carriage 30 back and forth longitudinally of the tilting frame 10 includes a screw member 60 extending lengthwise of the tilting frame 10. The screw member 60 is provided with external threads which may be Acme type threads, for example. The front portion of the screw member 60 is supported by a front thrust bearing 62 (FIGS. 3 and 4) mounted on a cross member 63 of the tilting frame 10. The rear portion of the screw member 60 is supported by a rear radial bearing 64 mounted on a cross member 65 of the tilting frame 10. The bearings 62 and 64 cooperate to hold the screw member 60 properly aligned with respect to the channel members 12 of the tilting frame 10 and allow the screw member to be rotated in either rotational direction.

A screw box 66 (FIGS. 5 and 6) having internal threads 67 is mounted on the carriage 30 and is provided with laterally extending trunnions 68 which fit into suitable holes provided in a pair of plates 70 fixed to the forward cross member 38 of the carriage 30. The internal threads 67 of the screw box 66 cooperate with the external threads of the screw member 60 to allow the screw member to extend completely therethrough so that rotation of the screw member 60 in one direction will cause the carriage 30 to move toward the front of the tilting frame 10, while rotation of the screw member 60 in the opposite direction will cause the carriage 30 to move toward the rear of the tilting frame 10.

A power source for rotating the screw member 60 may include a drive shaft 80 (FIG. 3) from the power takeoff of the vehicle for driving an hydraulic pump 82 which is connected with a supply of hydraulic fluid. Fluid under pressure from the hydraulic pump 82 is supplied through a line 84 to a control valve 86. Suitable means may be provided so that the operator may control the valve 86 while sitting in the cab 8. At the control valve 86 the fluid is directed into either one of a pair of supply lines 88 or 90 for driving an hydraulic motor 92 in either rotational direction. The hydraulic motor 92 is connected to a gear reduction box 94 which in turn drives the screw member 60.

In this manner, by controlling the valve 86, the operator may cause the hydraulic motor 92 to rotate in either rotational direction thereby causing the screw member 60 to rotate in the corresponding rotational direction. Accordingly, the operator may move the carriage 30 toward the front or toward the rear of the vehicle, as desired. Suitable means may be provided for directing the flow of fluid after the carriage 30 has reached either the rear or the front of the tilting frame 10 and for returning the fluid to the reservoir.

A detachable container of the type which may be used in connection with the vehicle and tilting frame structure is illustrated in FIGS. 1 and 2 and indicated by reference numeral 100. The dimensions of the body of the container from front to rear should be proportioned so that the container may be received by the tilting frame 10 as shown in FIG. 2. Except for this one dimension of the container, it may be of any suitable size and type as desired. For example, the container body may have an open or a closed top and have various combinations of lids, doors and tailgates. The character of the container depends upon the type of material to be handled.

Each container 100 is provided with a subframe structure (FIG. 7) which includes beams 102 extending lengthwise thereof. These beams form runners for supporting the body of the container 100 upon the top surfaces of the side members 12 of the tilting frame 10. The beams 100 should be spaced apart a distance which corresponds with spacing of the side members 12 of the tilting frame. The forward ends of the beams 102 are curved in the form of bows to facilitate the guiding of the container 100 onto the tilting frame. Suitable cross bracing and ribs 104 may be employed as necessary to strengthen the subframe structure.

A hook bar 106 extends lengthwise of the container 100 between the beams 102 and is held in position therebetween and strengthened by the ribs 104. The hook bar 160 does not extend downwardly as far as the beams 102 and is provided with a plurality of hook stations 108 spaced along the length thereof for engagement of the loop portion 46 of the bail 44 which may fit between the beams 102. The number and spacing of the hook stations 108 may be varied depending upon the length of the container. Each hook station 108 is formed with a pair of opposed hook surfaces 110 which open downwardly, either one of which may be engaged by the loop portion 48 of the bail 44 so that the carriage 30 may pull or push the container 100 onto or off the tilting frame 10. Pivotally mounted to the hook bar 106 between the hook surfaces 110 is a shuttle member 112 which serves to cover either one of the hook surfaces 110 to allow the loop portion 46 of the bail 44 to pass by the hook station 108 without engaging a hook surface 110.

The container structure and its cooperation with the bail is further explained in the above-mentioned applications, Serial No. 744,107, filed June 24, 1958; and Serial No. 800,320, filed March 18, 1959 to which reference may be made for a further explanation.

The container 100 may be filled if desired separate and apart from the vehicle while sitting on the ground or some other supporting surface. After the container has been filled, it may be loaded onto the vehicle and transported to a remote point where the contents of the container may be removed. The container may then be returned to the same place or to a different place for refilling. Any type of lading that is suitable for the container may be handled.

In picking up or loading the container, the vehicle is backed up to the front end portion of the container, while the latter is resting on the ground or other supporting surface, so that the rear of the vehicle is at or in close proximity to the front of the container. Then by operation of the power devices 26, the tilting frame 10 can be moved to an upwardly inclined position about its pivot shaft 16, as shown in FIG. 1, and as shown in broken lines in FIG. 3. If the stabilizing jack, illustrated in FIGS. 1 and 2 is used, the roller 20 may be swung into engagement with the ground. This will aid in supporting the rear of the vehicle during the moving of the container onto or off the tilting frame.

With the tilting frame 10 up, the operator may then actuate the power mechanism and, by properly controlling the valve 86, move the carriage 30 to the lower or rear end of the tilting frame 10. This position of the carriage 30 with respect to the tilting frame 10 is illustrated in broken lines in FIG. 3. The bail 44 normally is in a raised position with respect to the carriage 30 and extends above the top surfaces of the side members 12 of the tilting frame. The bail 44 will be projected below the lower end of the inclined tilting frame 10 and beneath the forward end of the container 100, as shown in dotted lines in FIG. 3.

If the vehicle and the container 100 are properly aligned, the bail 44 will enter under the front portion of the hook bar 106. The loop portion 48 of the bail 44 may then engage one of the front hook stations 108. The angle of the tilting frame 10 may be varied under control of the operator by proper manipulation of the power devices 26 so as to cause the loop portion 48 to enter one of the hook stations.

After the bail 44 engages the container 10 in this manner, the operator may then manipulate the valve 86 to move the carriage 30 toward the front of the vehicle in a continuous motion. This will pull the container 100 onto the tilting frame 10. The carriage may continue moving forwardly to its extreme forward position pulling the container with it. Thereafter, the carriage 30 and the bail 44 may be moved rearwardly while the container stays in place so that the loop portion 48 of the bail might engage an intermediate hook station 108 or the hook station at the extreme rear of the container. Upon forward movement of the carriage 30 again, the container 100 will be pulled farther onto the tilting frame 10. As the container is pulled onto the tilting frame, the beams 102 will skid along the upper surfaces of the side members 12. During the loading operation, the operator may lower the tilting frame by proper manipulation of the power devices 26.

In order to unload or discharge a container 100 from the vehicle, the loading operation is reversed. The loop portion 48 of the bail 44 is engaged in one of the intermediate hook stations 108 and the carriage 30 is moved to the rear of the tilting frame 10 by proper manipulation of the valve 86 which allows fluid to flow to the motor 92. This reverse movement of the carriage 30 and the container may be continued until the container has been moved to the rear of the tilting frame 10. At this point it may be necessary to move the carriage 30 a short distance forward on the tilting frame so that the loop portion 48 may engage one of the front hook stations 108. Thereafter, the carriage 30 may be moved toward the rear of the vehicle to push the container 10 completely off the vehicle.

The tilting frame can be varied in its angle of tilting movement from horizontal to inclined in order to facilitate the unloading of the container. The container can be set on a loading dock, railroad car, or other platform which is no higher than the tilting frame in level position; or the container can set on the ground. If the container is to be set on a raised platform, the tilting frame need not be elevated or elevated only slightly. The final removal of the container from the tilting frame 10 is completed by pushing the container or by pulling the vehicle away from the container.

The mechanism described is quite versatile in loading large-size containers onto a vehicle and in removing such containers from a vehicle. With this mechanism, control over the container during its movement onto or off the vehicle is maintained continuously. The use of cables is eliminated completely. The positive action between the threaded portions of a screw member 60 and the cooperating screw box 66 prevents any inadvertent movement of the carriage 30. That is, the carriage cannot move forwardly or rearwardly on the tilting frame unless the screw member 60 is rotated. Positive braking action of the container in either the loading or unloading operation, as when the tilting frame 10 is inclined, is accomplished very easily. This provides a very desirable safety feature. When cable devices are employed, for example, it is difficult, if not impossible, to achieve a safety feature in such an easy manner. Also, the use of a screw member in connection with a gear reduction box affords a relatively simple manner to get a high degree of mechanical advantage for moving containers of this size which are normally extremely heavy. Instead of using Acme type threads on the screw member 60 and the screw box 66, a circulating ball-type device may be used with the same advantages. Additionally, rather than using only one screw member extending lengthwise of the tilting frame, it may be found desirable to use two or possibly more such screw members, with a corresponding number of cooperating screw boxes on the carriage. The loading and unloading operations of the container may be carried out by the operator without the need of him to leave the cab of the vehicle.

While the invention has been illustrated and described in a certain embodiment, it is recognized that other variations and changes may be made therein, without departing from the invention as set forth in the claims.

We claim:

1. In container loading and unloading apparatus, the combination of a frame adapted to be mounted on a vehicle, a carriage having means for detachably engaging and moving a container supported in guided relation on the frame, means mounting the carriage on the frame below the container supporting surface thereof in guided relation with said frame, a screw box including trunnions mounting said screw box on the carriage and adapted for movement with respect thereto, a rotary member extending longitudinally of the frame and connected at opposite end portions therewith, drive means for said rotary member, and means forming a threaded connection between said rotary member and the screw box for causing movement of the carriage lengthwise of the frame upon operation of the rotary member.

2. In transporting equipment of the character described, the combination of a frame adapted to be mounted on a vehicle, said frame having a track thereon adapted to receive a separate container movable on the track lengthwise of said frame, a carriage mounted on the frame for movement therealong, hook means mounted on the carriage, means for moving the hook means to a raised position relative to the carriage for detachable engagement with cooperating hook means on the container, propelling means extending longitudinally of the frame and mounted thereon for rotation with respect thereto, and threaded means mounted on the carriage means and journaled with respect thereto, said threaded means having intermeshing engagement with the rotary propelling means to move the carriage relative to said frame.

3. In container loading and unloading apparatus, the combination with a motor vehicle, of a frame mounted on the vehicle for raising and lowering movements with respect thereto, means on the frame for receiving a container in seated position thereon, a carriage mounted and supported on the frame for movement lengthwise relative thereto, means on the carriage for connection with the container to move the container along the frame, a screw box including trunnions mounting said screw box on the carriage and adapted for movement with respect thereto, a rotary member extending longitudinally of the frame and connected at opposite end portions therewith, drive means for said rotary member, and means forming a threaded connection between said rotary member and the screw box for causing movement of the carriage lengthwise of the frame upon operation of the rotary member.

4. In container loading and unloading apparatus, the combination with a motor vehicle, of a frame mounted on the vehicle for raising and lowering movements with respect thereto, means on the frame for receiving a container in seated position thereon, a carriage mounted and supported on the frame for movement lengthwise relative thereto, means on the carriage for connection with the container to move the container along the frame, a rotary member extending longitudinally of the frame and connected at opposite end portions therewith, drive means for said rotary member, a member mounted on the carriage for bodily movement with respect thereto, and means forming a threaded connection between said rotary member and said member for causing movement of the carriage lengthwise of the frame upon operation of the rotary member.

References Cited by the Examiner

UNITED STATES PATENTS

| 1,243,636 | 10/1917 | Schulz | 214—516 |
| 1,736,935 | 11/1929 | Navarre | 198—221 |
| 1,838,459 | 12/1931 | Smith et al. | 121—39 |
| 2,132,612 | 10/1938 | Faries | 214—38.22 |
| 2,789,715 | 4/1957 | Filipoff et al. | 214—517 |
| 2,805,784 | 9/1957 | Dokken | 214—83.36 |
| 2,810,486 | 10/1957 | Elton | 214—82 |
| 2,867,339 | 1/1959 | Nelson | 214—517 |
| 2,963,185 | 12/1960 | Jones et al. | 214—505 |
| 3,049,378 | 8/1962 | Nelson | 214—517 X |
| 3,107,020 | 10/1963 | Dempster et al. | 214—505 |

GERALD M. FORLENZA, *Primary Examiner.*

MORRIS TEMIN, HUGO O. SCHULZ, *Examiners.*